(12) United States Patent
Schut

(10) Patent No.: US 6,189,672 B1
(45) Date of Patent: Feb. 20, 2001

(54) ROCKER-TYPE LOAD SEPARATING MECHANISM FOR A ROLLER CONVEYOR

(75) Inventor: David S. Schut, Rockwood (CA)

(73) Assignee: Interroll Holding AG, San Antonino (CH)

(*) Notice: Under 35 U.S.C. 154(b), the term of this patent shall be extended for 0 days.

(21) Appl. No.: 09/246,650

(22) Filed: Feb. 8, 1999

(51) Int. Cl.[7] .................................................. B65G 13/00
(52) U.S. Cl. ...................................... 193/35 A; 193/35 G
(58) Field of Search ........................................... 193/35 A

(56) References Cited

U.S. PATENT DOCUMENTS

| | | | |
|---|---|---|---|
| 1,669,497 | * | 5/1928 | Steegmuller . |
| 1,963,377 | * | 6/1934 | Paxton . |
| 2,565,001 | * | 8/1951 | Schutt . |
| 2,738,103 | * | 3/1956 | Bisese . |
| 3,216,547 | * | 11/1965 | DeGood et al. . |
| 3,532,201 | * | 10/1970 | McConnell . |
| 3,610,406 | * | 10/1971 | Fleischauer et al. ................. 198/789 |
| 3,810,534 | * | 5/1974 | Prete, Jr. ................................. 410/69 |
| 3,881,585 | * | 5/1975 | Coleman et al. ................... 193/35 A |
| 3,977,161 | * | 8/1976 | Faber et al. ............................. 53/313 |
| 3,986,605 | * | 10/1976 | Dooley et al. ........................ 198/746 |
| 4,099,404 | * | 7/1978 | Eberle ................................... 73/45.2 |
| 4,182,440 | * | 1/1980 | Juergens ............................. 193/35 A |
| 4,185,729 | * | 1/1980 | Obermeyer .......................... 193/35 A |
| 4,236,865 | * | 12/1980 | Ullman ................................. 414/786 |
| 4,363,593 | * | 12/1982 | Eberle .................................. 414/592 |
| 4,527,937 | * | 7/1985 | Tomasello, Jr. ....................... 414/273 |
| 4,744,451 | * | 5/1988 | Sekiguchi et al. ...................... 193/40 |
| 4,915,566 | * | 4/1990 | Elten .................................... 414/276 |
| 5,890,577 | * | 4/1999 | Faisant ............................... 193/35 A |
| 5,934,438 | * | 8/1999 | Hilerich, Jr. ........................ 193/35 A |

* cited by examiner

*Primary Examiner*—Christopher P. Ellis
(74) *Attorney, Agent, or Firm*—Coats & Bennett, PLLC

(57) ABSTRACT

A rocker-type load separating mechanism for a roller conveyor includes a rocker arm and a release mechanism. The rocker arm is pivotally mounted in a discharge zone of the conveyor. The rocker arm is movable between a first load blocking position in which an upstream end of the rocker arm extends into the conveyor pathway to block loads in the holding zone of the conveyor, and a load releasing position in which the upstream end is positioned out of the conveyor pathway to allow those to pass from the holding zone into a discharge zone of the conveyor. A manually actuated release mechanism applies force to the downstream end of the rocker arm to move the rocker arm from a load blocking position to the load releasing position. The force applied by the release mechanism overcomes the weight of loads in the holding zone pressing against the rocker arm when the rocker arm is in the load blocking position.

38 Claims, 6 Drawing Sheets

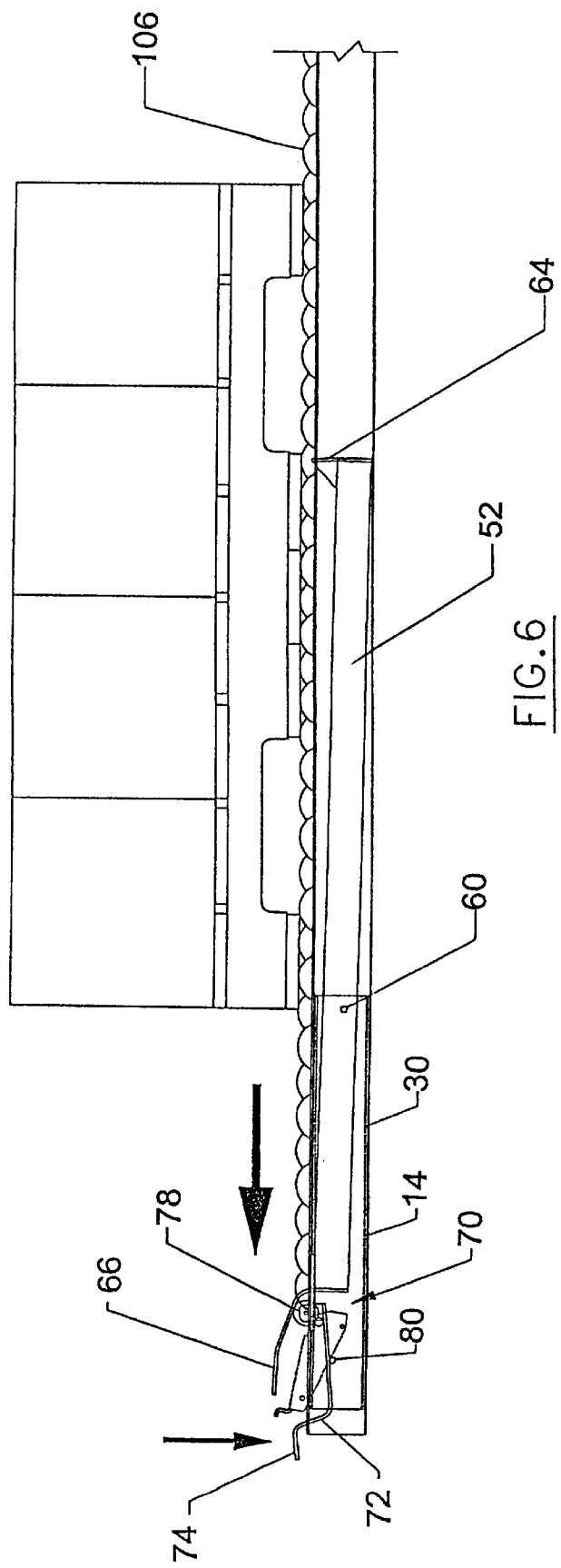

ROCKER-TYPE LOAD SEPARATING MECHANISM FOR A ROLLER CONVEYOR

FIELD OF THE INVENTION

The present invention relates generally to gravity type roller conveyors and, more particularly, to a load separating mechanism for separating successive loads on a roller conveyor.

BACKGROUND OF THE INVENTION

When removing loads from a roller conveyor, it is usually desirable to prevent the entire run of loads from bearing against the lead load at the discharge end of the conveyor so that the lead load can be easily removed. Various types of load spacing mechanisms have been used in the past for separating the lead load from the remaining loads on the conveyor. One type of device uses an actuating lever disposed at the discharge end of the conveyor that is connected by a mechanical linkage to a stop mechanism located at a point further upstream on the conveyor. When the lead load reaches the discharge end of conveyor, the weight of the load presses the actuating lever downward and causes the stop mechanism to move upward into the path of the next adjacent load. When the lead load is removed from the discharge end of the conveyor, the actuating lever returns to an normal position and the stop mechanism is retracted to allow the next load to move down the conveyor. Load separating mechanisms of this type are shown in the patent to vom Stein, U.S. Pat. No. 4,646,909, and Agnoff, U.S. Pat. No. 5,213,189.

Several drawbacks have been encountered with this type of load separating mechanism. One problem is the inherent complexity of the load separating mechanism. The load separating mechanisms typically have numerous components that complicate manufacture and assembly. Consequently, these types of mechanisms tend to be relatively expensive to produce. Further, the linkages which connect the actuating lever with the stop mechanism require periodic maintenance to maintain them in proper working order. Therefore, it is desirable to simplify the mechanism as much as possible to reduce costs and maintenance requirements.

Another drawback associated with the prior art load separating mechanisms is that the loads are released too quickly after a pallet is removed. The worker responsible for removing loads from the conveyor must have sufficient time to fully remove and dispose of the loads before the next load is released. In most prior art load separating mechanisms, the next load is released immediately as the lead load is lifted or partially removed from the discharge end of the conveyor. The patent to Agnoff addresses this problem by using a damper to delay the return of the actuating lever after a load is removed from the discharge end of the conveyor. This solution, however, further adds to the complexity of the mechanism and increases its cost.

SUMMARY AND OBJECTS OF THE INVENTION

The present invention relates to a load separating mechanism for a roller conveyor. The load separating mechanism generally comprises a rocker assembly and a release mechanism. The rocker assembly comprises an elongated rocker arm pivotally mounted at the discharge end of the conveyor. A pressure plate or camming surface is disposed at the downstream end of the rocker arm. A stop is connected to the upstream end of the rocker arm. The pivot point of the rocker arm is located downstream from the center of gravity of the rocker arm. Consequently, the force of gravity will cause the upstream end of the rocker arm to naturally assume a lowered or retracted position. The downstream end will naturally assume a raised or extended position.

As the lead load rolls to the discharge end of the conveyor, the load will engage the pressure plate at the downstream end of the rocker arm. The weight of the load pushes the downstream end of the rocker arm downward, causing the upstream end to assume a raised position. In this position, the next load on the conveyor engages the stop on the upstream end of the rocker arm and is prevented from travelling further downstream.

When the lead load is removed from the conveyor, the weight of the next load pressing against the stop prevents the rocker arm from returning to its natural load releasing position. Therefore, the present invention includes a manually actuated release mechanism.

The release mechanism comprises a release lever having a footpad at one end and a roller at the opposite end. The roller engages the underside of the pressure plate or camming surface. When the user presses downward by foot on the footpad, the roller engages the underside of the pressure plate and exerts an upward force on the downstream end of the rocker arm. As the downstream end of the rocker arm is raised, the upstream end lowers, releasing the next load.

The present invention provides a relatively simple construction for a load separating mechanism that is inexpensive to manufacture. Further, the reduced complexity of the load separating mechanism reduces maintenance requirements and opportunity for failure. Another advantage of the present invention is that loads are not automatically released when the lead load is removed from the conveyor. The worker responsible for removing loads from the conveyor can release the next load when he is ready. This reduces the chances that the worker will be injured.

BRIEF DESCRIPTION OF THE DRAWINGS

FIG. 6 is a longitudinal section view of a portion of a roller conveyor showing the load separating mechanism in a load releasing position.

DETAILED DESCRIPTION OF THE INVENTION

Figure 1:
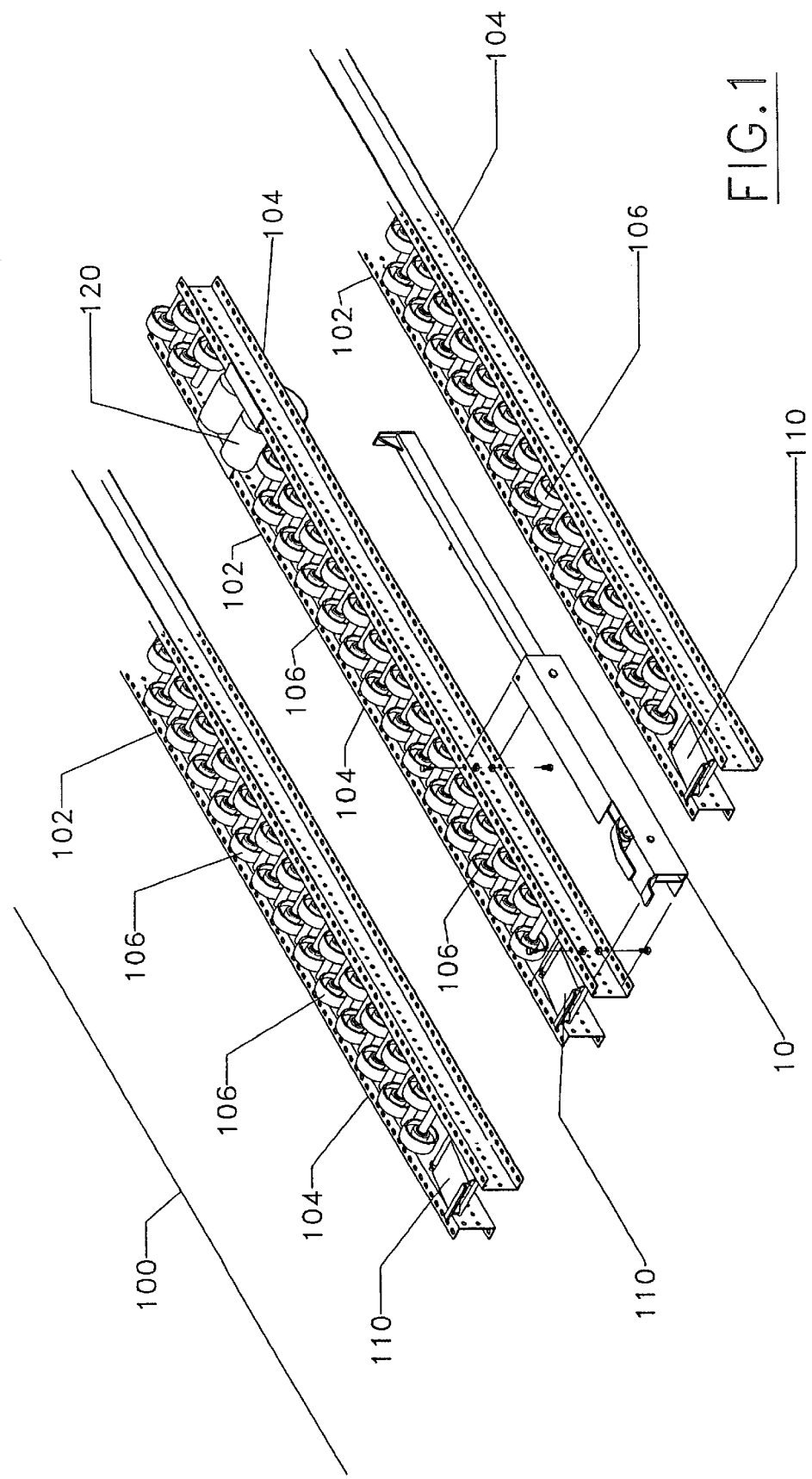
FIG. 1 is a perspective view showing the load separating mechanism and a portion of the roller conveyor.

Referring now to the drawings the load separating mechanism 10 of the present invention is shown therein mounted adjacent to the end of an inclined roller conveyor, indicated generally by 100. The conveyor 100 is a gravity conveyor in which loads move along the conveyor 100 under the force of gravity along an inclined surface. A discharge zone is positioned at the downstream end of the conveyor. The discharge zone is the zone at which the loads are removed from the conveyor. A holding zone is positioned upstream from the discharge zone. The holding zone is where succeeding loads are held while the lead load is being removed from the discharge zone.

Figure 2:
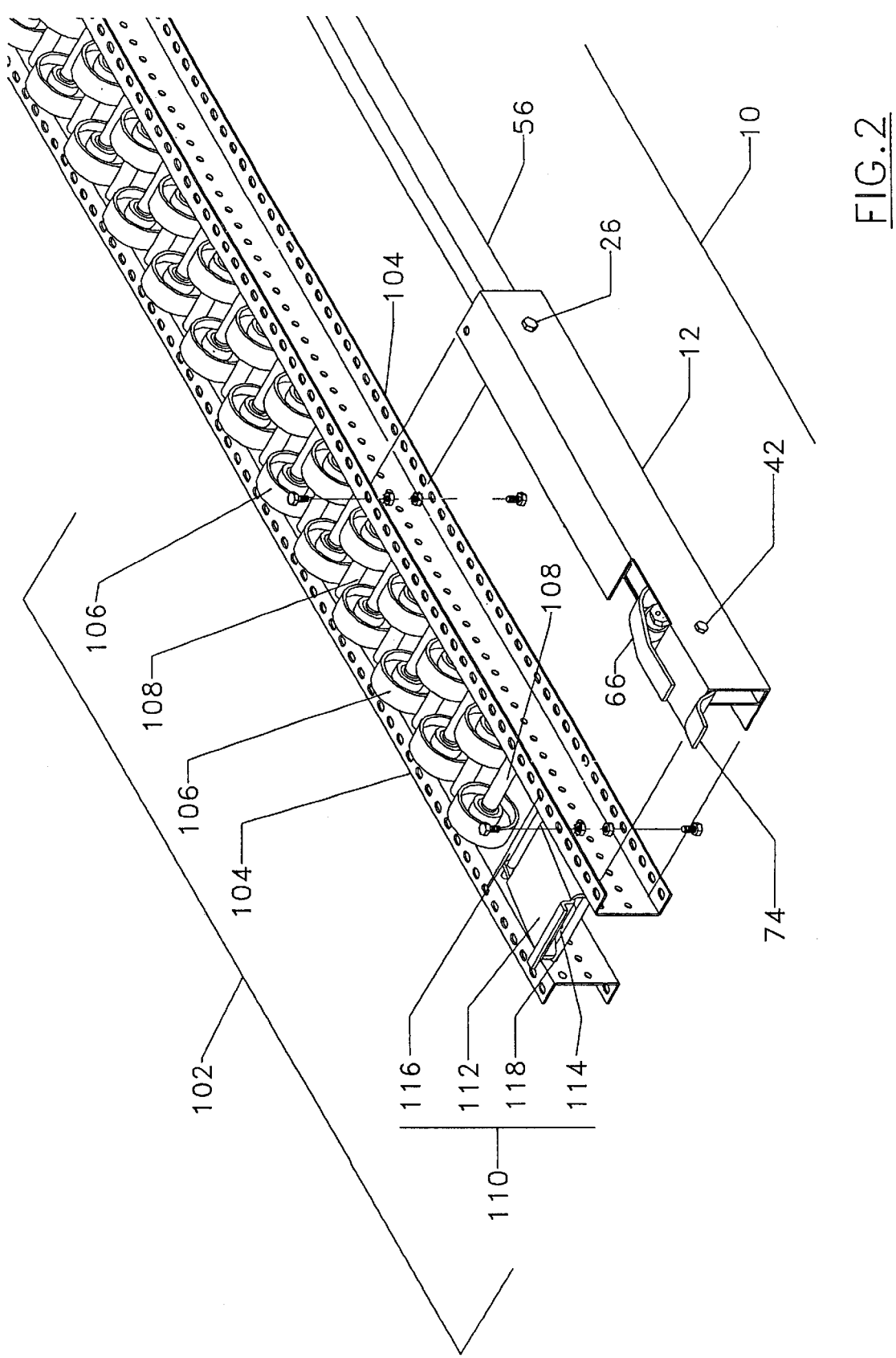
FIG. 2 is an exploded perspective view of the load separating mechanism.

The roller conveyor 100 comprises three laterally spaced track assemblies 102 that are attached to a support frame (not shown). The track assemblies 102 are shown in FIGS. 1 and 2. Each track assembly 102 includes a pair of side rails 104 with a series of rollers 106 disposed between the side rails 104. The rollers 106 are mounted on roller shafts 108 that extend between the side rails 104. The roller shafts 108 can be fixed to the side rails 104 by any suitable means, such as by bolting or welding. In the disclosed embodiment, adjacent rollers 106 are staggered as shown in FIG. 1. An end stop 110 is positioned at the downstream end of each track assembly 102 to prevent the loads from running off the end of the conveyor 100. In the disclosed embodiment, the stop comprises a stop plate 112 with a lip 114 that extends above the top surface of the rollers 106. The stop plate 112 is pivotally mounted on a shaft 116 extending between the side rails 104. Shaft 118 extends below the stop plate 112 to provide support for the stop plate 112. The construction of the stop plate 112 is not an important aspect of the present invention. Those skilled in the art will recognize that other forms of stops can be used. For example, the stop 110 could comprise a simple, flat plate welded or bolted to the end of the track assembly.

At least one of the track assemblies 102 also includes a brake assembly 120 disposed a predetermined distance from the discharge end of the conveyor 100. The brake assembly 120 is disposed in the holding zone where loads are held back by the load separating mechanism 10. The purpose of the brake assembly 120 is to slow the load that is second in line in the holding zone after the lead load is removed while the load that is first in line in the holding zone moves into the discharge zone of the conveyor. This prevents two loads from being released at the same time. Additionally, the brake assembly 120 prevents the loads from being jolted too severely when the load impacts the load separating mechanism. Since brake assemblies 120 are well known to those skilled in the art, a detailed description of the brake assembly is omitted.

Figure 3:
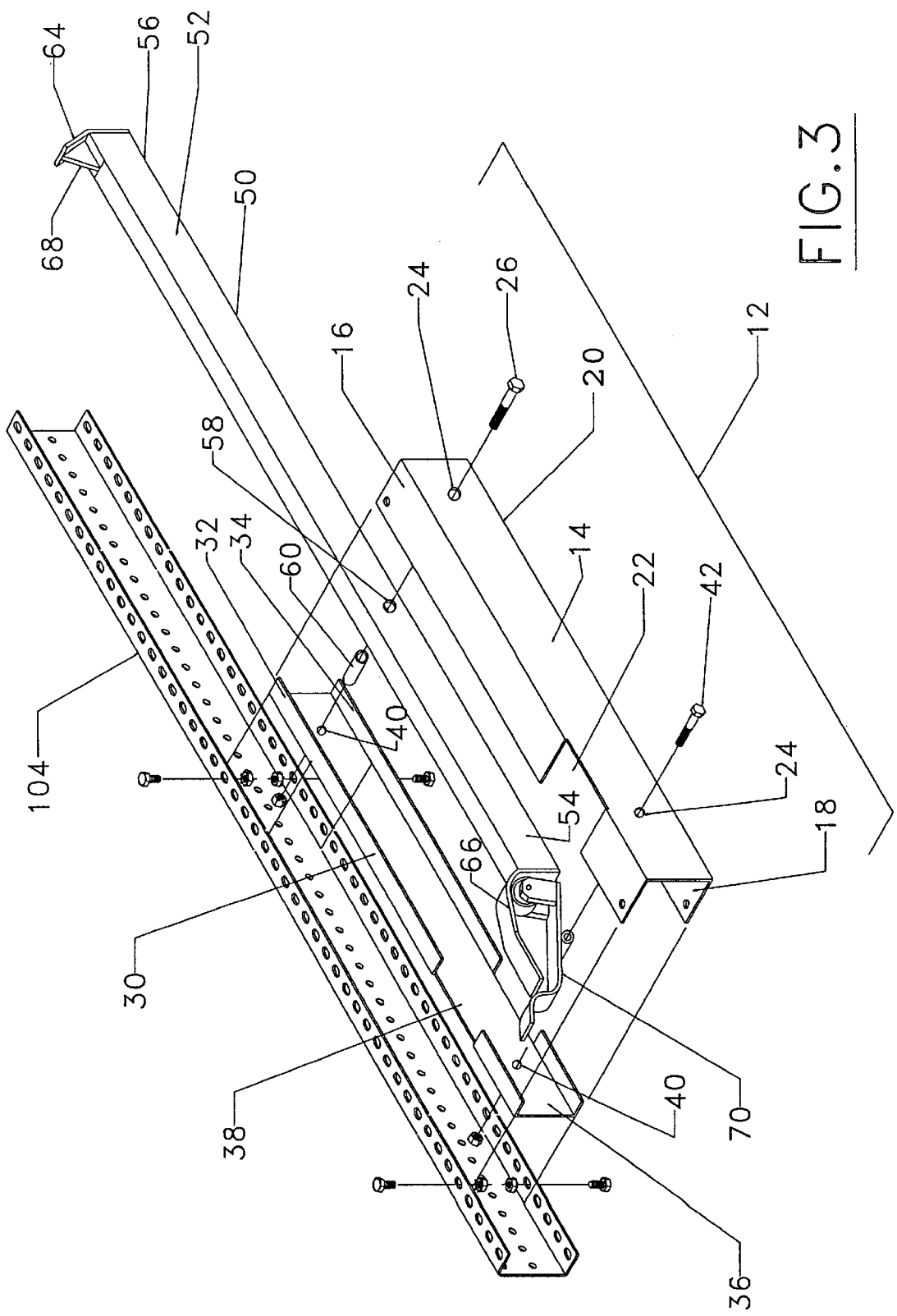
FIG. 3 is a partial perspective view of the load separating mechanism showing how it is mounted to the conveyor.

The load separating mechanism 10 is adapted to mount to one of the track assemblies 102 as shown in FIG. 3. In the disclosed embodiment, the load separating mechanism 10 mounts on the center track assembly 102, though it could mount to any of them. The purpose of the load separating mechanism 10 is to separate the lead load in the discharge zone from subsequent loads so that the lead load can be easily removed from the conveyor 100.

The load separating mechanism 10 generally includes a housing 12, a rocker assembly 50, and a release mechanism 70. The housing 12 serves to mount the load separating mechanism 10 to one of the track assemblies 102 of the conveyor 100. The rocker assembly 50 functions to separate loads on the conveyor. The rocker assembly 50 moves between a load blocking position in which loads are held back in an holding zone of the conveyor, and a load releasing position in which loads from the holding zone are allowed to flow downstream into the discharge zone. The rocker assembly 50 naturally assumes the load releasing position. When a load flows into the discharge zone, the lead load engages the rocker assembly 50, causing it to assume the load blocking position. Since the weight of the load in the holding zone prevents the rocker assembly 50 from returning to the load releasing position, the release mechanism 70 is provided to release loads from the holding zone. In the preferred embodiment, the release mechanism 70 is manually actuated by a foot.

The housing assembly 12 comprises two nested channels referred to herein as the outer channel 14 and a inner channel 30. The outer channel 14 includes a top flange 16, a bottom flange 18, and a side wall 20. The inner channel 30 includes a top flange 32, a bottom flange 34, and a side wall 36. The outer and inner channels 14, 30 are sized so that the inner channel 30 nests inside the outer channel 14. The outer and inner channels 14, 30 each include an opening 22 and 38, respectively, formed in their top flanges 16, 32. The purpose of the openings 22, 38 will be explained below.

The outer channel 14 includes bolt holes 24 at opposing ends of the channel 14 which align with similarly spaced bolt holes 40 in the inner channel 30. Bolts 26, 42 pass through respective sets of aligned bolt holes 24, 40 to secure the load separating mechanism 10 to a side rail 104 of the track assembly 102. As will be described below, the bolts 26, 42 also serve as pivot members for the rocker assembly 50 and release mechanism 70.

The rocker assembly 50 comprises an elongated rocker arm 52 including a downstream end 54 and an upstream end 56. A pivot hole 58 is formed in the rocker arm 52 at a point downstream from the gravity center of the rocker arm 52. A pivot bushing 60 is inserted into the pivot hole 58. The pivot bushing 60 serves both as a pivot member for the rocker arm 52 and as a spacer to maintain proper spacing between channels 14, 30. Bolt 26 passes through bushing 60 so that the rocker arm 52 pivots about the axis of bolt 26. Since the pivot point is located downstream from the center of the rocker arm 52, the upstream end 56 of the rocker arm 52 naturally assumes a lowered position with the downstream end 54 assuming a raised position. This position is referred to herein as the load releasing position. Alternatively, the pivot hole 58 could be disposed upstream from the center of gravity of the rocker arm 52 so that the rocker arm 52 naturally assumes a load blocking position. In this embodiment, the rocker arm 52 would return to the load blocking position before it is engaged by the load. A biasing means, such as a spring, could also be used to bias the rocker arm 52 to the desired position, though such is not the preferred embodiment.

A pressure plate 66 is secured to the downstream end 54 of the rocker arm 52. When the rocker arm 52 is in the load releasing position, the pressure plate 66 extends through the openings 22, 38 in the channels 14, 30 to a point above the top surface of the conveyor 100. Thus, when a load is discharged from the holding zone, the load will engage the pressure plate 66 and press it downward. The pressure plate 66 is curved so that the upper surface of the pressure plate 66 functions like a camming surface. When engaged by a load, the load rides up onto top surface of the pressure plate 66 forcing the downstream end 54 of the rocker arm 52 into a lowered position. In this position, the upstream end 56 is raised. This position is referred to as the load blocking position.

A stop 64 is disposed at the upstream end 56 of the rocker arm 52. The stop 64 includes a triangular gusset plate 68 to strengthen the stop 64. The geometry of the stop 64 is not a material aspect of the invention. The stop 64 may be a flat plate, or may be angled at the top as shown in FIG. 3. When the rocker arm 52 assumes a load blocking position, the stop 64 is raised into the path of any loads in the holding zone. Loads in the holding zone will travel downstream until the load engages the stop 64, at which time the load is prevented from moving into the discharge zone.

Figure 4:
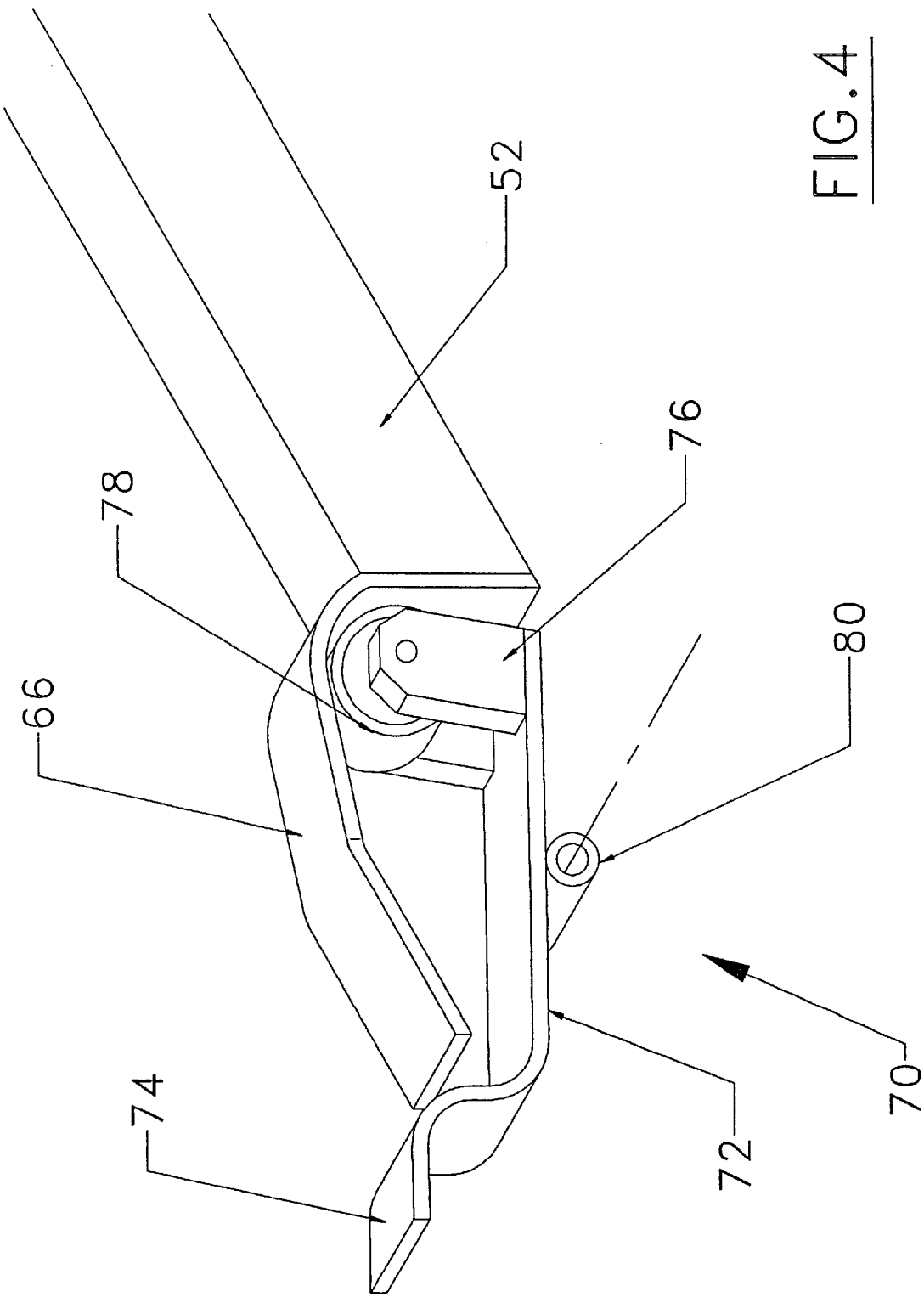
FIG. 4 is a partial perspective view of the load separating mechanism showing the release mechanism.

The release mechanism 70 is shown in FIG. 4. The release mechanism 70 includes a lever arm 72. A pivot bearing 80 is attached roughly at the center of the lever arm 72, although the precise location of the pivot bearing 80 is not critical. The lever arm 72 is bent at one end to form a footpad 74. A roller mount 76 is connected to the opposite end of the lever arm 72. A roller 78 is rotatably mounted to the roller mount 76.

The release mechanism 70 is held in place by bolt 42, which passes through the pivot bearing 80. Thus, the release mechanism 70 rotates about the axis of the bolt 42 between a raised position (footpad raised) and a lowered position (footpad lowered). The release mechanism 70 assumes the raised position when the rocker assembly 50 is in the load blocking position (downstream end lowered) and the lowered position when the rocker assembly 50 assumes the load releasing position (downstream end raised). The roller 78 engages the underside of the pressure plate 66. When the rocker arm 52 is forced downward by the weight of a load in the discharge zone, the pressure plate 66 presses down on the roller 78, causing the footpad 74 to assume a raised position. When the lead load is removed from the discharge zone, the weight of the loads in the holding zone, acting against the stop 64, prevents the rocker assembly 50 from returning to the load releasing position. To overcome the force of the loads in the holding zone, the worker can press the downward by foot on the footpad 74. When the footpad 74 is pressed downward, the roller 78 applied an upward force to the underside of the pressure plate 66, raising the downstream end 54 of the rocker arm 52.

Figure 5:
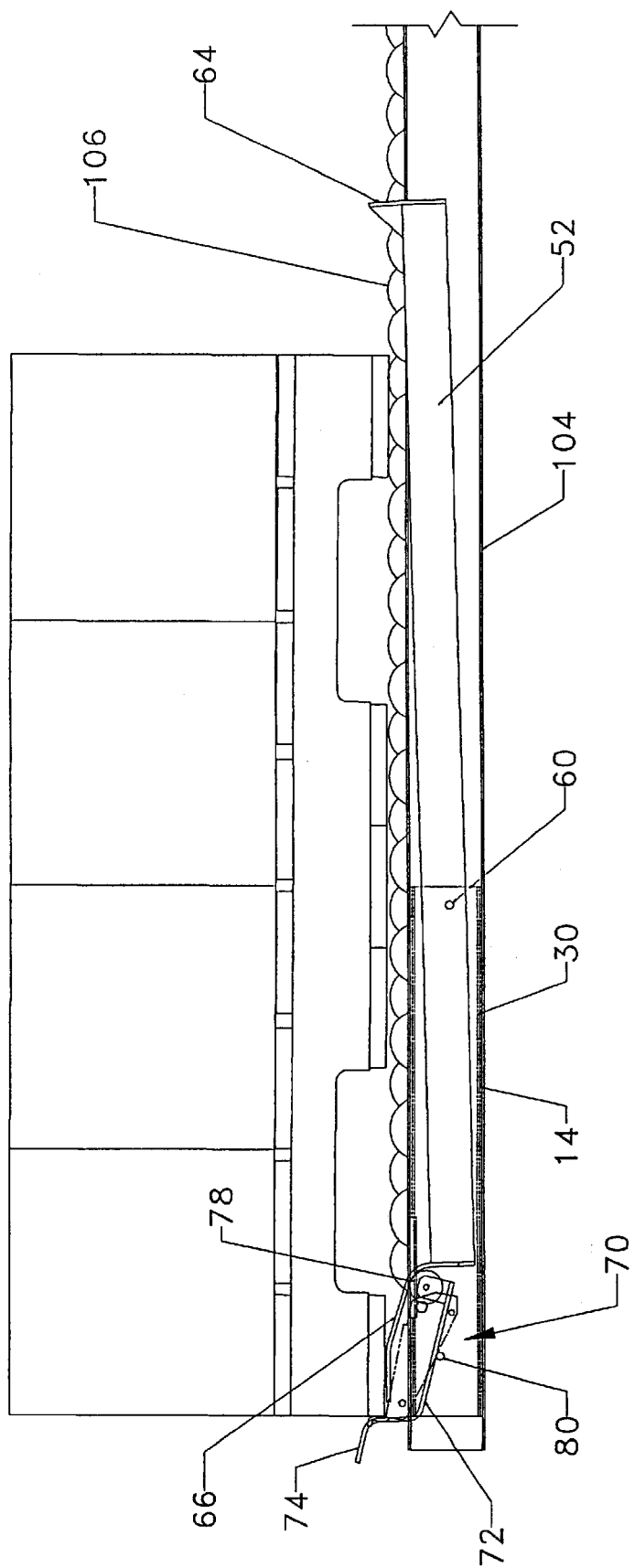
FIG. 5 is a longitudinal section view of a portion of a roller conveyor illustrating the load separating mechanism of the present invention in a load blocking position.

FIGS. 5 and 6 illustrate the operation of the load separating mechanism 10. In FIG. 6, a load has just been released from the holding zone and is travelling into the discharge zone of the conveyor 100. Note that the stop 64 on the upstream end of the rocker arm 52 is lowered permitting the load to flow into the discharge zone. As the load flows into the discharge zone, it engages the pressure plate 66 and presses down on the rocker arm 52 as seen in FIG. 5. The weight of the load causes the stop at the upstream end of the rocker arm 52 to be raised into the path of the next load preventing it from entering the discharge zone. To release the next load (the first load in the holding zone), the worker steps on the footpad 74 and presses it down as shown in FIG. 6.

The load separating mechanism 10 of the present invention provides a relatively simple solution to the problem of separating loads on a conveyor. The mechanism has relatively few moving components which are of relatively sturdy construction. Therefore, the load separating mechanism 10 of the present invention is relatively inexpensive to produce, operate, and maintain. Further, the load separating mechanism allows the worker to determine when to release loads from the holding zone so that the worker is not caught unaware.

What is claimed is:

1. A load separating mechanism for a roller conveyor providing a pathway for conveying a plurality of loads, comprising:
   a. a rocker arm pivotably mounted in a discharge zone of the conveyor, said rocker arm having an upstream end and a downstream end and being movable between a first load blocking position in which said upstream end extends into the conveyor pathways and is adapted to completely stop loads in a holding zone of the conveyor, and a second load releasing position in which the upstream end is positioned out of the conveyor pathway to allow loads to pass from said holding zone into the discharge zone; and
   b. a release mechanism for applying force to said rocker arm to overcome the weight of loads in said holding zone pressing against said rocker arm when the rocker arm is in the load blocking position, and to move said rocker arm to the load releasing position.

2. The load separating apparatus of claim 1, wherein said release mechanism includes a lever having a first end positioned under said downstream end and a second end extending outward from said downstream end.

3. The load separating apparatus of claim 2, wherein said second end includes a footpad actuated by a user to apply a force to the rocker arm and move the rocker arm from said blocking position to said load releasing position.

4. The load separating apparatus of claim 3, wherein said release mechanism further includes a roller mounted at the first end of said lever for engaging the downstream end of said rocker arm.

5. The load separating apparatus of claim 1, wherein said rocker arm includes a pressure plate mounted at the downstream end of the rocker arm that is engaged by loads in the discharge zone, and wherein the weight of said loads in the discharge zone cause the rocker arm to assume the load blocking position.

6. The load separating apparatus of claim 1, wherein said rocker arm includes a stop mounted at the upstream end thereof that extends above the top surface of said conveyor and is engaged by loads in the holding zone when the rocker arm is in the load blocking position.

7. The load separating apparatus of claim 1, wherein said rocker arm pivots about a point downstream of center of the rocker arm so that the force of gravity causes the rocker arm to naturally assume said load releasing position.

8. The load separating apparatus of claim 1, wherein said rocker arm pivots about a point upstream of center of the rocker arm so that the force of gravity causes the rocker arm to naturally assume said load blocking position.

9. The load separating apparatus of claim 1, including means to bias said rocker arm to said load releasing position.

10. The load separating apparatus of claim 1, including means to bias said rocker arm to said load blocking position.

11. The load separating apparatus of claim 1, further including a housing for mounting said rocker arm to a frame member of said conveyor.

12. The load separating apparatus of claim 1, wherein said housing comprises two nested channels defining a chamber therebetween for said rocker arm.

13. The load separating apparatus of claim 1, wherein said housing is secured by bolts to said conveyor frame member wherein said rocker arm is pivotally mounted to a first one of said bolts.

14. The load separating apparatus of claim 13, wherein said release mechanism is pivotally mounted to a second one of said bolts.

15. A load separating mechanism for segregating loads on a roller conveyor comprising:
   a. a rocker arm pivotably mounted in a discharge zone of the conveyor, said rocker arm having an upstream end and a downstream end and being movable between a first load blocking position in which said upstream end extends into the conveyor pathway to stop loads in a holding zone of the conveyor, and a second load releasing position in which the upstream end is positioned out of the conveyor pathway to allow loads to pass from said holding zone into the discharge zone;
   b. a stop mounted at the upstream end of said rocker arm that extends into the conveyor pathway when the rocker arm is in the load blocking position to block loads in the holding zone and prevent said blocked loads from entering into the discharge zone of the conveyor;

c. a pressure plate mounted at the downstream end of said rocker arm that is engaged by a load in said discharge zone, wherein the weight of said load in said discharge zone causes said rocker arm to assume the load blocking position; and d. a release mechanism for applying force to the downstream end of said rocker arm to overcome the weight of loads in said holding zone pressing against said rocker arm when the rocker arm is in the load blocking position, and to move said rocker arm to the load releasing position.

16. The load separating apparatus of claim 15, wherein said release mechanism includes a lever having a first end positioned under said downstream end and a second end extending outward from said downstream end.

17. The load separating apparatus of claim 16, wherein said second end includes a footpad actuated by a user to apply a force to the rocker arm to move the rocker arm from said load blocking position to said load releasing position.

18. The load separating apparatus of claim 17, wherein said release mechanism further includes a roller mounted at the first end of said lever for engaging the pressure plate at the downstream end of said rocker arm to apply force to said rocker arm.

19. The load separating apparatus of claim 15, wherein said rocker arm pivots about a point downstream of center of the rocker arm so that the force of gravity causes the rocker arm to naturally assume said load releasing position.

20. The load separating apparatus of claim 15, wherein said rocker arm pivots about a point upstream of center of the rocker arm so that the force of gravity causes the rocker arm to naturally assume said load blocking position.

21. The load separating apparatus of claim 15, including means to bias said rocker arm to said load releasing position.

22. The load separating apparatus of claim 15, including means to bias said rocker arm to said load blocking position.

23. The load separating apparatus of claim 15, further including a housing for mounting said rocker arm to a frame member of said conveyor.

24. The load separating apparatus of claim 23, wherein said housing comprises two nested channels defining a chamber therebetween for said rocker arm.

25. The load separating apparatus of claim 24, wherein said housing is secured by bolts to said conveyor frame member wherein said rocker arm is pivotally mounted to a first one of said bolts.

26. The load separating apparatus of claim 25, wherein said release mechanism is pivotally mounted to a second one of said bolts.

27. A roller conveyor including a load separating device for separating loads in a discharge zone of the conveyor from the remaining loads, comprising:

a. a pair of space apart frame members;

b. a plurality of longitudinally spaced rollers rotatably mounted between said frame members and defining a load carrying surface for conveying loads toward said discharge zone;

c. a rocker arm pivotably mounted in said discharge zone of the conveyor, said rocker arm having an upstream end and a downstream end and being movable between a first load blocking position in which said upstream end extends into the conveyor pathway and is adapted to completely stop loads in a holding zone of the conveyor, and a second load releasing position in which the upstream end is positioned out of the conveyor pathway to allow loads to pass from said holding zone into the discharge zone; and b. a release mechanism for applying force to the downstream end of said rocker arm to overcome the weight of loads in said holding zone pressing against said rocker arm when the rocker arm is in the load blocking position, and to move said rocker arm to the load releasing position.

28. The load separating apparatus of claim 27, wherein said release mechanism includes a lever having a first end positioned under said downstream end and a second end extending outward from said downstream end.

29. The load separating apparatus of claim 28 wherein said second end includes a footpad actuated by a user to apply a force to the rocker arm and move the rocker arm from said load blocking position to said load releasing position.

30. The load separating apparatus of claim 29, wherein said release mechanism further includes a roller mounted at the first end of said lever for engaging the downstream end of said rocker arm.

31. The load separating apparatus of claim 27, wherein rocker arm includes a pressure plate mounted at the downstream end of the rocker arm that is engaged by loads in the discharge zone, and wherein the weight of said loads in the discharge zone cause the rocker arm to assume a load blocking position.

32. The load separating apparatus of claim 27 wherein said rocker arm includes a stop mounted at the upstream end thereof that extends above the top surface of said conveyor and is engaged by loads in the holding zone when the rocker arm is in the load blocking position.

33. The load separating apparatus of claim 27, wherein said rocker arm pivots about a point downstream of center of the rocker arm so that the force of gravity causes the rocker arm to naturally assume said load releasing position.

34. The load separating apparatus of claim 27, wherein said rocker arm pivots about a point upstream of center of the rocker arm so that the force of gravity causes the rocker arm to naturally assume said load blocking position.

35. The load separating apparatus of claim 27, further including a housing for mounting said rocker arm to a frame member of said conveyor.

36. The load separating apparatus of claim 27, wherein said housing comprises two nested channels defining a chamber therebetween for said rocker arm.

37. The load separating apparatus of claim 27, wherein said housing is secured by bolts to said conveyor frame member wherein said rocker arm is pivotally mounted to a first one of said bolts.

38. The load separating apparatus of claim 37, wherein said release mechanism is pivotally mounted to a second one of said bolts.

* * * * *